P. & B. DE MATTIA.
PNEUMATIC TIRE BUILDING CORE.
APPLICATION FILED OCT. 19, 1915.
1,194,968.
Patented Aug. 15, 1916.
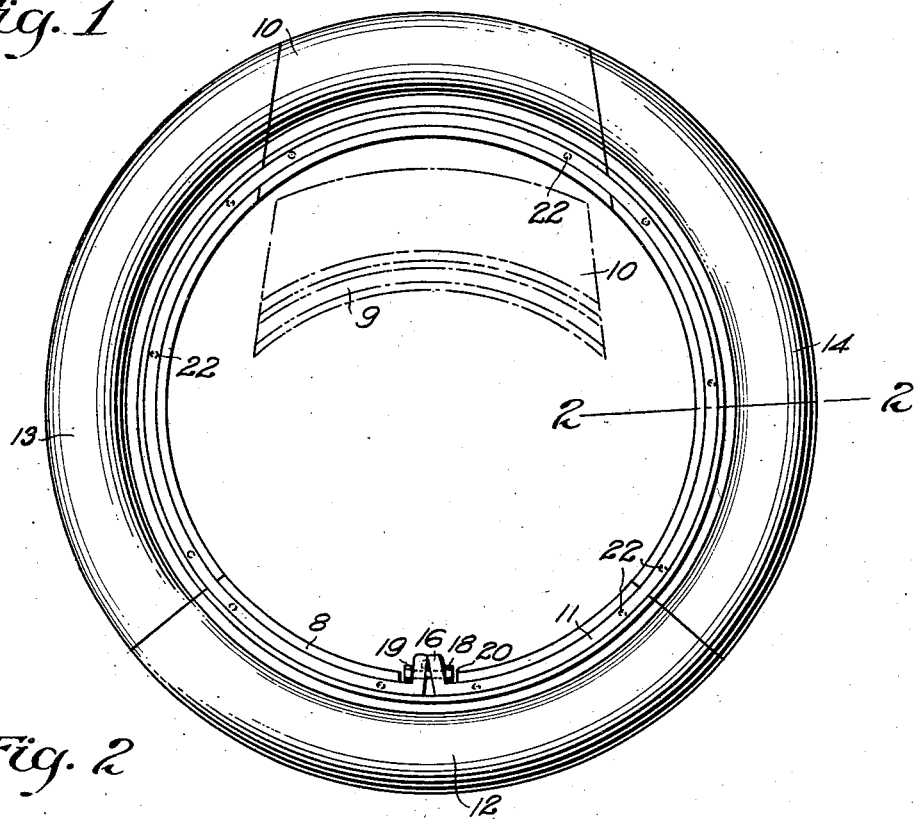
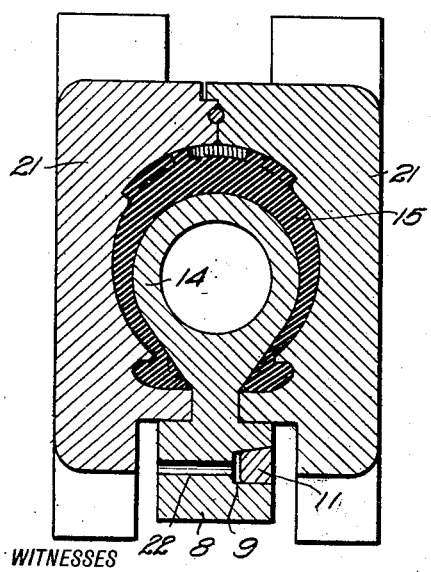

UNITED STATES PATENT OFFICE.

PETER DE MATTIA AND BARTHOLD DE MATTIA, OF CLIFTON, NEW JERSEY.

PNEUMATIC-TIRE-BUILDING CORE.

1,194,968.　　　　Specification of Letters Patent.　　Patented Aug. 15, 1916.

Application filed October 19, 1915. Serial No. 56,725.

*To all whom it may concern:*

Be it known that we, PETER DE MATTIA and BARTHOLD DE MATTIA, both citizens of the United States, and residents of Clifton, in the county of Passaic and State of New Jersey, have invented a new and Improved Pneumatic-Tire-Building Core, of which the following is a full, clear, and exact description.

Among the principal objects which the present invention has in view are: to provide simple and efficient means for locking up in operative relation sections of a tire core; to provide means for registering the sections of the core when assembling the same; and to provide means for rapidly and conveniently unlocking the core.

*Drawings.*—Figure 1 is a side view of a core of the character mentioned shown as locked up or ready to have a tire built thereon, the means for locking the same being constructed and arranged in accordance with the present invention; Fig. 2 is a cross section of a tire mold and tire core, and means for locking up the same, said means being constructed and arranged in accordance with the present invention, said section being taken as on the line 2—2 in Fig. 1, and Fig. 3 is a longitudinal section, showing the ends of the locking ring.

*Description.*—In the present core, while preserving the general lines of match or junction, the inner structure of the core sections have an enlarged internal base flange 8. The sections of the core when forming the flange 8 are provided with a channel 9, the inner wall of which is parallel to the axis of the core. The outer wall of the channel 9 is inclined as best shown in Fig. 2 of the drawings, the object being to lift the key-section 10 of the core to its seat when the split ring 11 is tamped or driven home.

The core sections 10, 12, 13 and 14 are assembled as shown in Fig. 1 of the drawings, and when so assembled, the channel 9, portions of which are formed in each of the sections, will be found to aline more or less accurately.

Before proceeding to build the tire 15, the ring 11 is relaxed and placed in the channel 9, which it, in turn, more or less accurately fits according as the sections 10, 12, 13 and 14 match. Any disalinement of the core sections will be corrected as the ring 11 is driven into the channel. The inclined surface at the outer edge of the ring 11 operates to expand the various sections outwardly from a common center.

The ring 11 has, at each end, a bracket extension 16. One of the extensions is furnished with a globular projection 17, while the other extension has a corresponding socket to receive the said projection. This construction is best shown in Fig. 3 of the drawings, where also it will be noted that the adjacent faces of the extensions flare outwardly, which allows for drawing upon the ring 11 to seat the said core sections and hold them more rigidly in service relation. To this end, the extensions 16 are perforated and a bolt 18 and nut 19 are employed in conjunction therewith for bearing upon the sides of the extensions to press the straight surfaces of the same together. In this connection, it will be noted that the projection 17 and the socket corresponding with the same, function to hold the ends of the ring 11 in alinement, and to afford a rocking joint for the said extensions while the nut 19 is tightened on the bolt 18.

As seen best in Fig. 1 of the drawings, the inner edge of the base flange 8 is cut away to form a recess wherein the head of the bolt 18 and the nut 19 rest. Sufficient clearance is provided to facilitate the manipulation of the nut 19.

In the operation of locking up the core, it will be understood that as the ring 11 is contracted by means of the bolt 18 and nut 19, said ring is also to be driven down into the channel 9 with the ultimate effect that the inclined surface at the outer edge of the said ring forces the sections 10, 12, 13 and 14 into perfect register.

After the tire 15 has been completed and after the molds 21 have been removed, the ring 11 may be driven from its seat rapidly and easily by passing a suitable tool or punch through orifices 22 formed in the base flange 8 and opening into the channel 9. In other words, it is not imperative that the operation of extracting the core sections from the tire should wait on the slower, if better, method of relieving the ring from strain by loosening the nut 19.

It is obvious that when the ring 11 is removed, the key-section 10 may be drawn toward the center of the tire, the tapered sides of the said section facilitating this action. It is also understood how when the section 10 is removed, each of the sections 13, 14 and 12 may be taken from the interior of the tire, when again, if needed, the core may be reassembled and locked up by the use of the ring 11 and the bolt 18.

Claims:

1. An apparatus as characterized, comprising a plurality of matched core sections, one of said sections being a key-section provided with outwardly-converging wedging ends, said sections forming an inwardly-extending base flange, said base flange provided with an annular channel having a straight side for alining said sections and an inclined side for adjusting said sections; a split ring shaped in cross section in correspondence with said channel; a plurality of brackets, each connected with one of the ends of said ring, said brackets being operatively united to form a rocking connection; and means engaging the said brackets intermediate said ring and the rocking connection of said brackets for rocking said brackets on their connection for contracting said ring.

2. An apparatus as characterized, comprising a plurality of matched core sections, one of said sections being a key-section provided with outwardly-converging wedging ends, said sections forming an inwardly-extending base flange, said base flange provided with an annular channel having a straight side for alining said sections and an inclined side for adjusting said sections; a split ring shaped in cross section in correspondence with said channel; a plurality of brackets, each connected with one of the ends of said ring, said brackets being operatively united to form a rocking connection; and means engaging the said brackets intermediate said ring and the rocking connection of said brackets for rocking said brackets on their connection to contract said ring, said means embodying alined perforations formed in said brackets, a bolt extending through said perforations, and a nut engaging said bolt.

3. An apparatus as characterized, comprising a plurality of matched core sections, one of said sections being a key-section provided with outwardly converging wedging ends, said sections forming an inwardly-extending base flange, said base flange provided with an annular channel having a straight side for alining said sections and an inclined side for adjusting said sections, said sections having a series of perforations opening into said channel; a split ring shaped in cross section in correspondence with said channel; a plurality of brackets, each connected with one of the ends of said ring, said brackets being operatively united to form a rocking connection; and means engaging the said brackets intermediate said ring and the rocking connection of said brackets for rocking said brackets on their connection to contract said ring, said means embodying alined perforations formed in said brackets, a bolt extending through said perforations, and a nut engaging said bolt.

PETER DE MATTIA.
BARTHOLD DE MATTIA.

Witnesses:
ISAAC WHITE,
MARY BURKHARDT.

Copies of this patent may be obtained for five cents each, by addressing the "Commissioner of Patents, Washington, D. C."